United States Patent
Schneider et al.

(10) Patent No.: US 7,725,282 B2
(45) Date of Patent: May 25, 2010

(54) METHOD FOR PROVIDING A PATTERN FORECAST

(75) Inventors: Welf Schneider, Karlsruhe (DE);
Jochen Schabinger, Muehlacker-Enzberg (DE); Ulrike Albrecht, Aulendorf (DE); Heike Suthaus, Walzbachtal-Joehlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/799,504

(22) Filed: May 1, 2007

(65) Prior Publication Data
US 2008/0021652 A1    Jan. 24, 2008

(30) Foreign Application Priority Data
May 2, 2006    (DE) ................... 10 2006 020 176

(51) Int. Cl.
  *G06F 17/60*    (2006.01)

(52) U.S. Cl. .................. 702/109; 705/7; 705/8; 705/10; 707/1; 707/101; 713/200

(58) Field of Classification Search ............ 702/3, 702/109; 704/1; 706/50, 52, 47, 61; 707/1–7, 707/100–104.1, 200–202; 713/200–202; 705/7, 8, 10, 50–52
See application file for complete search history.

(56) References Cited

U.S. PATENT DOCUMENTS

| | | | |
|---|---|---|---|
| 3,829,831 A * | 8/1974 | Yamamoto et al. | 382/225 |
| 5,255,342 A * | 10/1993 | Nitta | 704/200 |
| 7,103,609 B2 * | 9/2006 | Elder et al. | 707/102 |
| 7,272,586 B2 * | 9/2007 | Nauck et al. | 706/52 |
| 2003/0195740 A1 * | 10/2003 | Tokuda et al. | 704/1 |
| 2004/0088276 A1 * | 5/2004 | Elder et al. | 707/1 |
| 2004/0199573 A1 * | 10/2004 | Schwartz et al. | 709/201 |
| 2004/0220771 A1 * | 11/2004 | Breiman | 702/181 |
| 2005/0060217 A1 * | 3/2005 | Douglas et al. | 705/9 |
| 2005/0102175 A1 * | 5/2005 | Dudat et al. | 705/10 |
| 2007/0219992 A1 * | 9/2007 | Bollinger et al. | 707/6 |
| 2007/0220030 A1 * | 9/2007 | Bollinger et al. | 707/101 |

* cited by examiner

*Primary Examiner*—Carol S Tsai
(74) *Attorney, Agent, or Firm*—Kenyon & Kenyon LLP

(57) ABSTRACT

A method for providing a pattern forecast for an object from a number of objects that are associated with one another, in which the pattern forecast is provided by taking into account consumption series of these associated objects. A device for providing a pattern forecast for an object from a number of objects that are associated with one another, the device being designed to provide the pattern forecast by taking into account consumption series of these associated objects.

7 Claims, 3 Drawing Sheets

METHOD FOR PROVIDING A PATTERN FORECAST

FIELD OF THE INVENTION

The present invention relates to a method and a device for providing a pattern forecast as well as a computer program and a computer program product.

BACKGROUND INFORMATION

Pattern forecasts usually include mathematical forecasts for forecast objects based on consumption series, i.e., histories from the past for the particular forecast objects which may be compiled on the basis of patterns.

Previous methods for generating forecasts use only the consumption series for the particular object for which the forecast is to be generated. Through novel methods, fluctuations in the history may be compensated or smoothed directly in generating the forecast.

Forecast methods from the literature include:
the method for exponential smoothing of the first order,
the method for exponential smoothing of the second order,
the method for exponential smoothing of the third-order (according to Winters),
the method of the sliding average, and
regression analysis.

The history of the object for which the forecast is to be generated is used in creating the forecast.

SUMMARY OF THE INVENTION

In the exemplary method according to the present invention for providing a pattern forecast for an object from a number of associated objects, the pattern forecast is supplied by taking into account the consumption series of these associated objects.

Using this method, the pattern forecast may be determined in such a way that the object for which the pattern forecast is generated and thus a forecast object may be supplied in a quantity that is at least adequate and may be optimal. This method may be used in all areas of statistical forecasting. The method is thus suitable, e.g., for disposition planning, warehousing or stocking objects and thus articles or products of all types. A forecast may be provided on the basis of patterns using the present method.

Any number of associated objects may be used. According to the exemplary embodiment and/or exemplary method of the present invention, inventories or quantities of these objects vary over a period of time; consumption series, i.e., historical patterns, are derivable from such time-dependent changes in quantity, e.g., by observation for each of these objects. In performing the method for providing the pattern forecast for one of these associated objects, at least one consumption series of one or the objects associated with the particular object is taken into account. This means that a consumption series for the object for which the pattern forecast is being provided may also be taken into account.

The exemplary embodiment and/or exemplary method of the present invention also relates to a device for providing a pattern forecast for an object from a number of associated objects. This device is designed to provide the pattern forecast, taking into account the consumption series for these associated objects.

The exemplary device according to the present invention is designed to perform all the steps of the exemplary method according to the present invention.

The exemplary device according to the present invention may have at least one module suitable for performing the method, in particular a computing device. In one embodiment, this device is designed to determine the pattern forecast, so that the object, i.e., the forecast object, may be supplied in an optimal quantity as part of disposition planning. This may take place in such a way that the device cooperates with at least one logistic device and influences a function of these devices, e.g., by control and/or regulation. Furthermore, the device may also be designed to provide the product directly.

The exemplary embodiment and/or exemplary method of the present invention also relates to a computer program having program code for performing all the steps of an exemplary method according to the present invention when the computer program is executed on a computer or a corresponding computing unit, in particular in an exemplary device according to the present invention.

The exemplary embodiment and/or exemplary method of the present invention also relates to a computer program product having program code which are stored on a computer-readable data medium to perform all the steps of an exemplary method according to the present invention when the computer program is executed on a computer or a corresponding computing unit, in particular in an exemplary device according to the present invention. Some examples of a computer readable medium include compact discs and digital versatile discs (DVDs).

A time series analysis, e.g., third-order exponential smoothing, known in the literature as the seasonal method, may be used for calculating the basic values for the method. In performing this method for a pattern forecast, the seasonal coefficients required for this method are to be stipulated externally instead of being calculated implicitly merely based on the consumption series of the actual forecast object, i.e., the pattern object. According to the exemplary embodiment and/or exemplary method of the present invention, the seasonal coefficients for the method for pattern forecasting are to be stipulated by aggregation, i.e., accumulation or compilation of the consumption series, i.e., the histories of associated objects; then the seasonal coefficients may be normalized. In this way, fluctuations in the consumption series of individual objects may be compensated, i.e., smoothed, with regard to the trend. Information from the environment of the consumption series of the object, i.e., the forecast object, which may be any material, may thus be taken into account in compiling the forecast, i.e., the pattern.

The generation of a pattern is based on the third-order exponential smoothing method in which consumption series of associated objects are aggregated. Fluctuations in the history of the forecast object may be compensated in this way. For aggregation of the consumption series, i.e., histories, objects of an object family are used, and thus associated objects that are interconnected, interlinked, combined and/or networked are used and combined.

In an empirical analysis, significant advantages resulted from an ex-post analysis in comparison with the previous methods. Forecasts may be improved by up to 20% to 30% in this way. To do so, an ex-post analysis was performed on a representative selection of 350 objects, in this case different articles, products and materials for the demands of a pool warehouse.

The histories of the products within a product class and/or an object family were used for the aggregation. The degree of automation for creation of the forecast and for object acquisition planning may be increased significantly by using this method.

In one embodiment, this method may be run schematically by performing the steps listed, which may be performed in succession:
1) providing, in particular ascertaining, the best possible pattern, i.e., the optimal pattern for the object for which the pattern forecast is being provided,
2) providing, in particular selecting, a method for calculation of the basic values,
3) calculating the pattern forecast, in which the selected pattern and the method ascertained may be combined for performing the basic value calculation.

In one implementation of the exemplary embodiment and/or exemplary method of the present invention, parameters and formulas are used with the definitions and notations given below for the required variables.

S stands for the length of a season, where $S \in \mathrm{IN}$. K corresponds to the number of seasons for which historical data, in particular historical sales data, are available, where $K \in \mathrm{IN}$. H stands for a history, in particular a sales history:

$$H=(h_1, h_2, \ldots, h_{S*K}),$$

where $h_t \in \mathrm{IR}$ corresponds to sales achieved and/or implemented during a period t and may be used as a seasonal coefficient.

A pattern has the following form:

$$P=(p_1, p_2, \ldots, p_s)$$

a pattern factor $p_t \in \mathrm{IR}_0^+$, where $t \in \{1, \ldots, S\}$ represents the average sales in the t-th period of the season as a multiple of the average period sales of the entire season and may also be used as a seasonal coefficient. Thus, a pattern is always normalized to season length S:

$$\sum_{i=1}^{S} p_i = S$$

In an inspected logistics center, values T=12 and K=2 may be used for history H and pattern P.

$$H=(h_1, h_2, \ldots, h_{24}) \text{ and } P=(p_1, p_2, \ldots, p_{12}).$$

Basic quantity $g_{t,t+\tau}$ for period $t+\tau$ is calculated based on the sales data for periods $t, t-1, \ldots, 1$, where $g_{t,t+\tau} \in \mathrm{IR}_0^+$ and $t=1, \ldots, K \cdot S$, $\tau \in \mathrm{IN}$.

Forecast $f_{t,t+\tau} \in \mathrm{IR}_0^+$ for period $t+\tau$ is calculated based on the sales data for periods $t, t-1, \ldots, 1$ where $t=1, \ldots, K \cdot S$, $\tau \in \mathrm{IN}$.

In addition, the following formulas also apply:
x MD y=y, if (x mod y=0) and
x MD y=x mod y, otherwise.

Table 1 shows values for this procedure using the example of y=4:

TABLE 1

| | x | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| x mod y | 1 | 2 | 3 | 0 | 1 | 2 | 3 | 0 | 1 | 2 | 3 | 0 |
| x MD y | 1 | 2 | 3 | 4 | 1 | 2 | 3 | 4 | 1 | 2 | 3 | 4 |

The basic formula $$f_{t,t+\tau} = p_{(t+\tau)MD\ S} * g_{t,t+\tau}, \text{ where } t=1, \ldots, K \cdot S, \tau \in \mathrm{IN}$$

is used for the forecast calculation, i.e., pattern forecast.

For calculation of basic values, the method of first-order exponential smoothing may be used, referred to here as variant G1, using smoothing parameter $\alpha \in [0,1]$, where $s_t$ is the value of the simple exponential smoothing of period t. Initialization is performed by $$s_1 = h_1 \text{ and } s_2 = \alpha \cdot h_1 + (1-\alpha) \cdot s_1 = h_1.$$

For each additional period:

$$s_t = \alpha \cdot h_{t-1} + (1-\alpha) \cdot s_{t-1}.$$

For the basic value, this then yields:

$$g_{t,t+\tau} = s_t, \text{ where } t=2, \ldots, K \cdot S, \tau \in \mathrm{IN}.$$

Alternatively, the third-order exponential smoothing using smoothing parameters $\alpha \in [0,1]$, $\beta \in [0,1]$ and a given season in the form of a pattern P may be used for the basic value calculation according to variant G2. Initialization may be performed here via the externally given season factors, i.e., seasonal coefficients, where no trend is taken into account for $\beta = 0$:

$$b_1 = \frac{h_1}{p_1}, t_1 = 0 \text{ and}$$

$$b_2 = \frac{\alpha}{p_2} \cdot h_1 + (1+\alpha) \cdot b_1, t_2 = b_2 - b_1,$$

if $\beta \neq 0$ and $t_2 = 0$, if $\beta = 0$.

After the values are initialized, the additional values are calculated as follows:

$$b_t = \frac{\alpha}{p_{tMDS}} \cdot h_t + (1-\alpha) \cdot (b_{t-1} + t_{t-1}) \text{ for } t = 3, \ldots, S \cdot K$$

$$t_t = \beta \cdot (b_t - b_{t-1}) + (1-\beta) \cdot t_{t-1} \text{ for } t = 3, \ldots, S \cdot K.$$

These values are calculated up to S*K, then they are used for calculating the basic values, i.e., $$g_{t,t+\tau} = b_t + \tau \cdot t_t \text{ for } t=3, \ldots, S \cdot K.$$

Furthermore, calculations for basic values may be performed according to a variant G3 using other methods, e.g., via time series analysis, e.g., the method of second-order exponential smoothing or the method of the sliding average.

For ascertaining patterns in general, an operational input, i.e., data entry, and/or values of parameters to be introduced may be taken into account. In this regard, patterns may be selected or predetermined on the basis of empirical values, whereby a normalization of the patterns is to be taken into account. In one example, typical basic curves may be generated, taking expert knowledge into account.

In another general parameter determination, aggregation of histories from the environment of the forecast object and their normalization may be performed. To do so, according to the exemplary embodiment and/or exemplary method of the present invention, histories from the product group and/or product hierarchy of the objects to which the one forecast object belongs are to be aggregated and normalized.

For optimal, i.e., the best possible, pattern finding for an object, according to variant P1 which follows, an adjustment may be performed with a history of the object. In this regard, a so-called history pattern $HP:=(hp_1, hp_2, \ldots, hp_S)$ is ascertained from the historical data on the object:

$$hp_i = \frac{\sum_{k=0}^{K-1} h_{i+k \cdot S}}{\frac{K \cdot S}{K \cdot S} \sum_{t=1}^{K \cdot S} h_t} = \frac{\sum_{k=0}^{K-1} h_{i+k \cdot S}}{\sum_{t=1}^{K \cdot S} h_t} \cdot S$$

where i=1, ..., S.

This historical pattern is compared with the pattern available for selection, i.e., #P on the whole. For each pattern l available for selection, a distance evaluation $\Delta^l$ is performed for historical pattern HP thus generated, e.g., using the distance dimension and/or the so-called mean average deviation:

$$\Delta^l = \frac{1}{S} \cdot \sum_{i=1}^{S} |hp_i - p_i^l|$$

for $l = 1, \ldots, \#P$.

Alternatively, the Gaussian sum of error squares may be used for this purpose:

$$\Delta^l = \frac{1}{S} \cdot \sum_{i=1}^{S} (hp_i - p_i^l)^2$$

for $l = 1, \ldots, \#P$.

A pattern l* having the minimal distance from HP is used for pattern forecasting, and the following condition applies:

$$\Delta^{l^*} := \min_{l=1,\ldots,\#P} \{\Delta^l\}$$

Alternatively, an optimal pattern finding for the object is implementable by ascertaining it with the aid of ex-post forecast (variant P2). In this case, a selection of patterns $P^l$ is given, where l=1, ..., #P.

For each pattern $P^l$ where l=1, ..., #P, basic values $g_{t,t+1}$ may now be calculated according to the basic value calculation using third-order exponential smoothing (G2), and an ex-post forecast may be formulated as follows:

$$fex_{t,t+1}^l = p_{(t+1)MD} \, s \cdot g_{t,t+1} \text{ for } t=3, \ldots, S \cdot K-1 \text{ and } l=1, \ldots, \#P.$$

For these ex-post forecasts, an (ex-post) error measure is calculated using the following equation:

$$AD^l = \sum_{t=3}^{S \cdot K-1} |h_{t+1} - fex_{t,t+1}^l| \text{ where } l=1, \ldots, \#P.$$

A pattern l* is thus used for the pattern forecast, where the pattern has the following minimal error dimension:

$$AD^{l^*} := \min_{l=1,\ldots,\#P} \{AD^l\}.$$

In another embodiment, according to a variant P3, a pre-generated pattern or any pattern may be selected for optimal pattern finding; this may involve patterns having operational input and/or patterns generated based on expert knowledge.

In the method for pattern forecasting for the object, the formula $$f_{t,t+\tau} = p_{(t+\tau)MD} \, s^{l*} \cdot g_{t,t+\tau} \text{ where } t=3, \ldots, S \cdot K \text{ and } \tau \in \mathbb{N}$$

is generally used in combination with the calculation options indicated above for basic values G1, G2, G3 and variants P1, P2, P3 for ascertaining the pattern.

When using established procedures, the forecast is generated only from the information on the object on which the information is based. These procedures are currently industry standard and are implemented in conventional disposition systems and standard software systems. In comparison with the exemplary method according to the present invention, these standard procedures yield definitively inferior results and require too much effort because of the manual corrections in execution when used for disposition.

DETAILED DESCRIPTION

Figure 1:
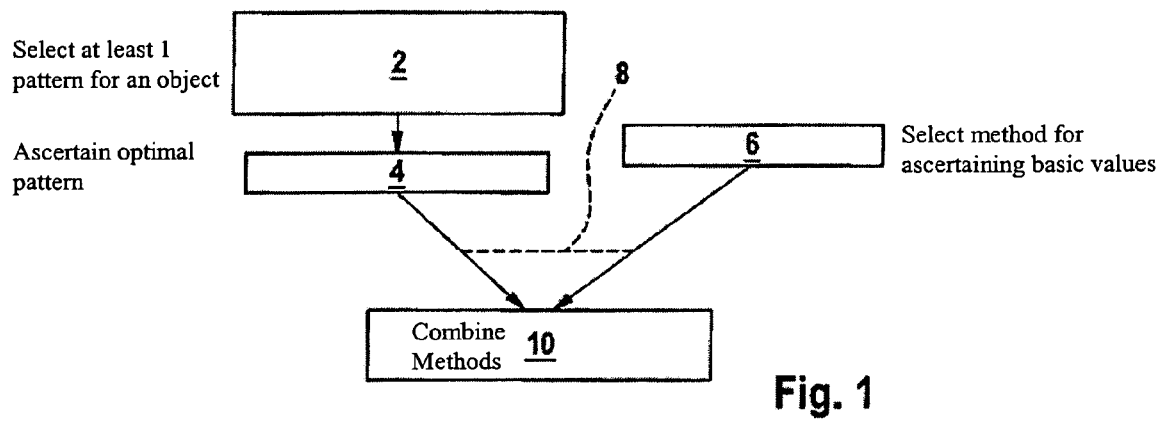
FIG. 1 shows a schematic diagram of a first embodiment of the method of the present invention.

In the schematic diagram of the first embodiment of the method in FIG. 1, at least one pattern for an object is to be selected in a first step 2. In a second step 4, an optimal pattern for the object is then ascertained among the at least one selected object. Furthermore, in a third step 6 a method for ascertaining basic values is selected. In the present embodiment, this may be accomplished by taking into account 8 the at least one selected pattern. A suitable pattern may also be determined taking into account the method performed in step 6. In a fourth step 10 an ascertained optimal pattern is combined with the selected method for ascertaining basic values to provide the pattern forecast.

Multiple patterns are usually ascertained and thus selected in first step 2, these patterns being providable by
aggregation from a history of the object and usually supplementary normalization, by
aggregation from histories of a group of mutually associated objects, e.g., from product groups or product hierarchies, and usually supplementary normalization, by
preselection of a pattern based on expert knowledge and by selection of any pattern.

The object for which the pattern forecast is provided is an object from the group of mutually associated objects. Thus, the pattern forecast takes into account not only the consumption series for an object for which the pattern forecast is being provided, but also the consumption series for objects associated with this object.

In second step 4 an optimal pattern is ascertained from one of variants P1, P2 or P3. With variant P1 an object history of the object is adjusted. Variant P2 includes an ascertaining step based on an ex-post forecast; according to variant P3, any pattern is taken into account.

In third step 6, three variants G1, G2 and G3 of the method for ascertaining basic values are available for selection, namely first-order exponential smoothing using smoothing parameters (variant G1), third-order exponential smoothing using smoothing parameters and a preselected season as the pattern (variant G2) or at least one additional method (variant G3) that is suitable for ascertaining or calculating the basic values, e.g., the method of second-order exponential smoothing or the method of the sliding average.

In fourth step 10 the pattern forecast is calculated using the following equation by combining the selected pattern $p_{(t+\tau)MD\ s}^{1*}$ with basic value method $g_{t,t+\tau}$:

$$f_{t,t+\tau} = p_{(t+\tau)MD\ s}^{1*} \cdot g_{t,t+\tau}, \text{ indices given above.}$$

Figure 2:
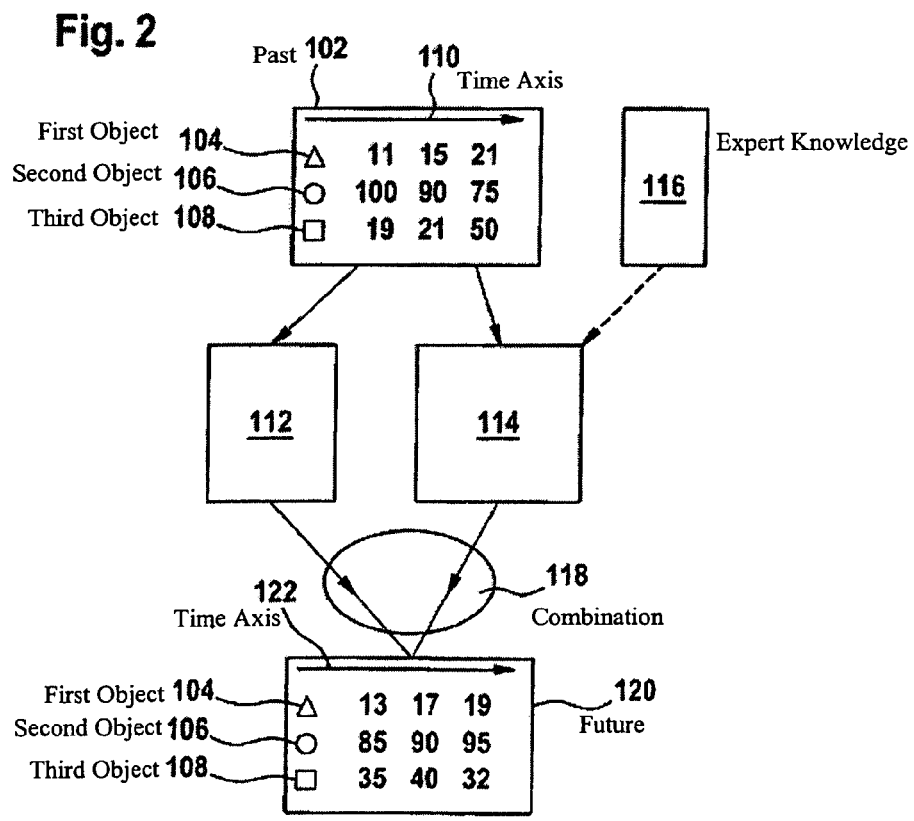
FIG. 2 shows a schematic diagram of a second embodiment of the method of the present invention.

In the diagram of a second embodiment of the method as illustrated in FIG. 2, inventory trends for associated objects 104, 106, 108, in past 102 are compiled over a period of time, which is plotted here on time axis 110, by observing a change over time in discrete time increments of the particular quantities of these objects 104, 106, 108. Through these observations, consumption series and thus historical curves for objects 104, 106, 108 may be determined.

In this embodiment, a first object 104, shown schematically here as a triangle, is requested, e.g., from an inventory, and is thus required 11 times at a first point in time in past 102, 15 times at a second point in time in past 102 and 21 times at a third point in time in past 102. A second object 104, represented schematically here by a circle, is needed 100 times at a first point in time in past 102, 90 times at a second point in time and 75 times at a third point in time in the past. A third object 108 is represented schematically here as a square. This third object is needed 19 times at a first point in time in past 102, 21 times at a second point in time in past 102 and 50 times at the third point in time in the past.

Consumption series "11, 15, 21" for third object 104, consumption series "100, 90, 75" for second object 106 and consumption series "19, 21, 50" for third object 108 are used for selecting 112 a method for ascertaining the basic values according to one of variants G1, G2 or G3 described above. Furthermore, these consumption series are used for ascertaining 114 a pattern according to one of variants P1, P2 or P3 described above. For ascertaining the pattern, expert knowledge 116 may be taken into account, if necessary. According to the exemplary embodiment and/or exemplary method of the present invention, when the pattern for one of objects 104, 106, 108 is ascertained, at least one consumption series of one object 104, 106, 108 that is associated with object 104 and/or 106 and/or 108, for which the pattern is to be ascertained, is taken into account.

By combination 118 of the ascertained pattern and the selected method for ascertaining the basic values, pattern forecasts for objects 104, 106, 108 may be provided for future 120. With such pattern forecasts, trends in consumption of objects 104, 106, 108 may be predicted for different points in time in future 120. Particular predicted values resulting from pattern forecasts are plotted on a time axis 122 for objects 104, 106, 108.

The pattern forecast for first object 104 thus reveals that it will be needed 13 times at a first point in time in the future, 17 times at a second point in time and 19 times at a third point in time. According to the pattern forecast for second object 106, it will be needed 85 times at the first point in time, 90 times at the second point in time and 95 times at the third future point in time. Third object 108 will be needed 35 times at the first point in time, 40 times at the second point in time and 32 times at third future point in time 120.

To provide a pattern forecast for one of these associated objects 104, 106, 108, the consumption series for all associated objects 104, 106, 108 are taken into account.

Figure 3:
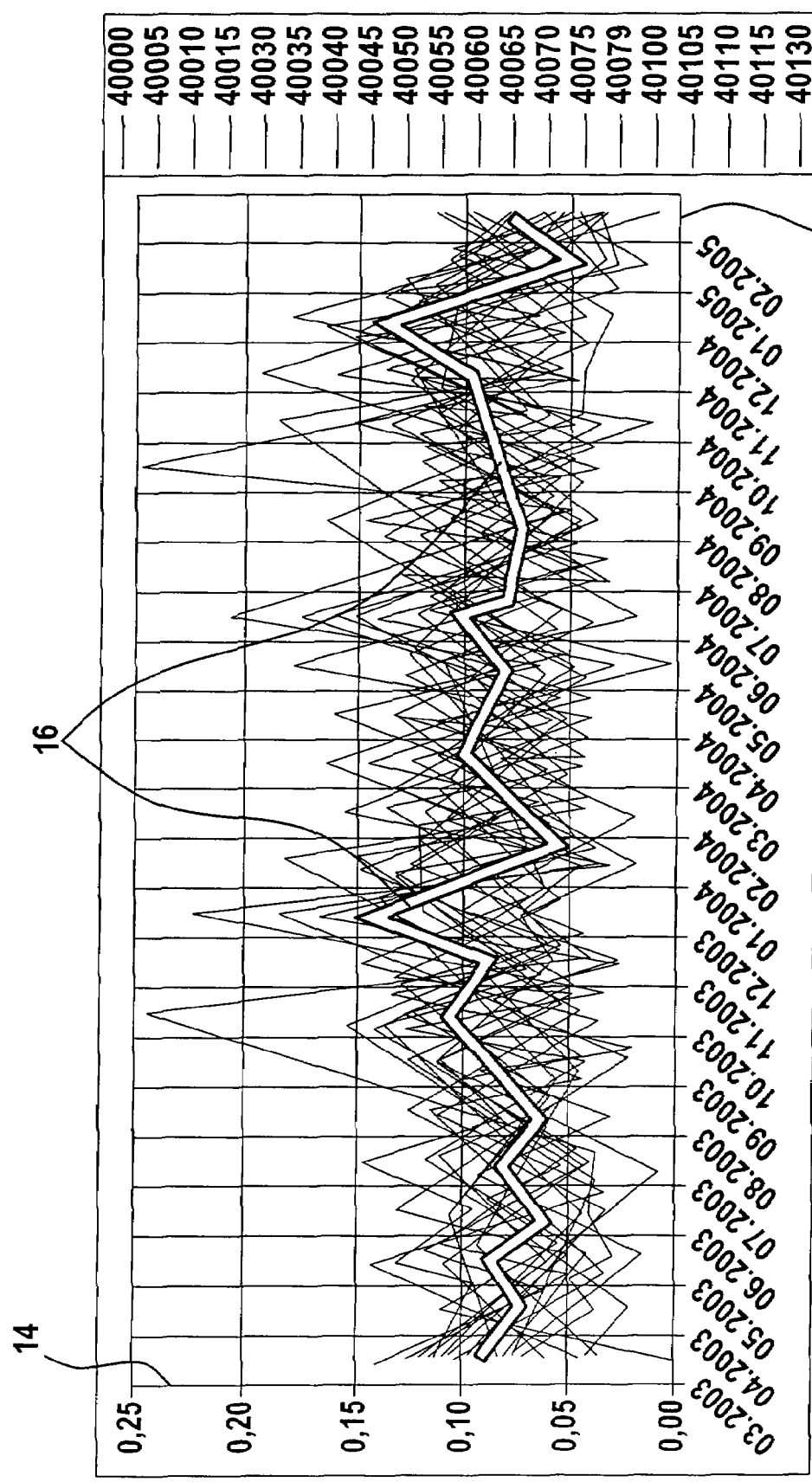
FIG. 3 shows a graphic chart illustrating various historical curves.

In FIG. 3, values of the normalized consumption series are plotted on an axis 14 as a function of a time axis 12, thus yielding historical curves of associated objects, shown here via numbers 40000, 40005, 40010, 40015, 40030, 40035, 40040, 40045, 40050, 40055, 40060, 40065, 40070, 40075, 40079, 40100, 40105, 40110, 40115, 40130, for individual products, in this case articles, on a monthly basis, e.g., from March 2003 (March 2003) until February 2005 (February 2005) here. In this embodiment, one period thus includes an interval of time of one month. Historical curves 40000, 40005, 40010, 40015, 40030, 40035, 40040, 40045, 40050, 40055, 40060, 40065, 40070, 40075, 40079, 40100, 40105, 40110, 40115, 40130 are thus subject to great fluctuations.

Line 16, which is shown in bold and is largely an "averaging" equalizing curve, represents a pattern compiled on the basis of historical values from historical curves 40000, 40005, 40010, 40015, 40030, 40035, 40040, 40045, 40050, 40055, 40060, 40065, 40070, 40075, 40079, 40100, 40105, 40110, 40115, 40130.

To provide a pattern forecast for a forecast product, consumption series are aggregated for products associated with the forecast product.

Figure 4:
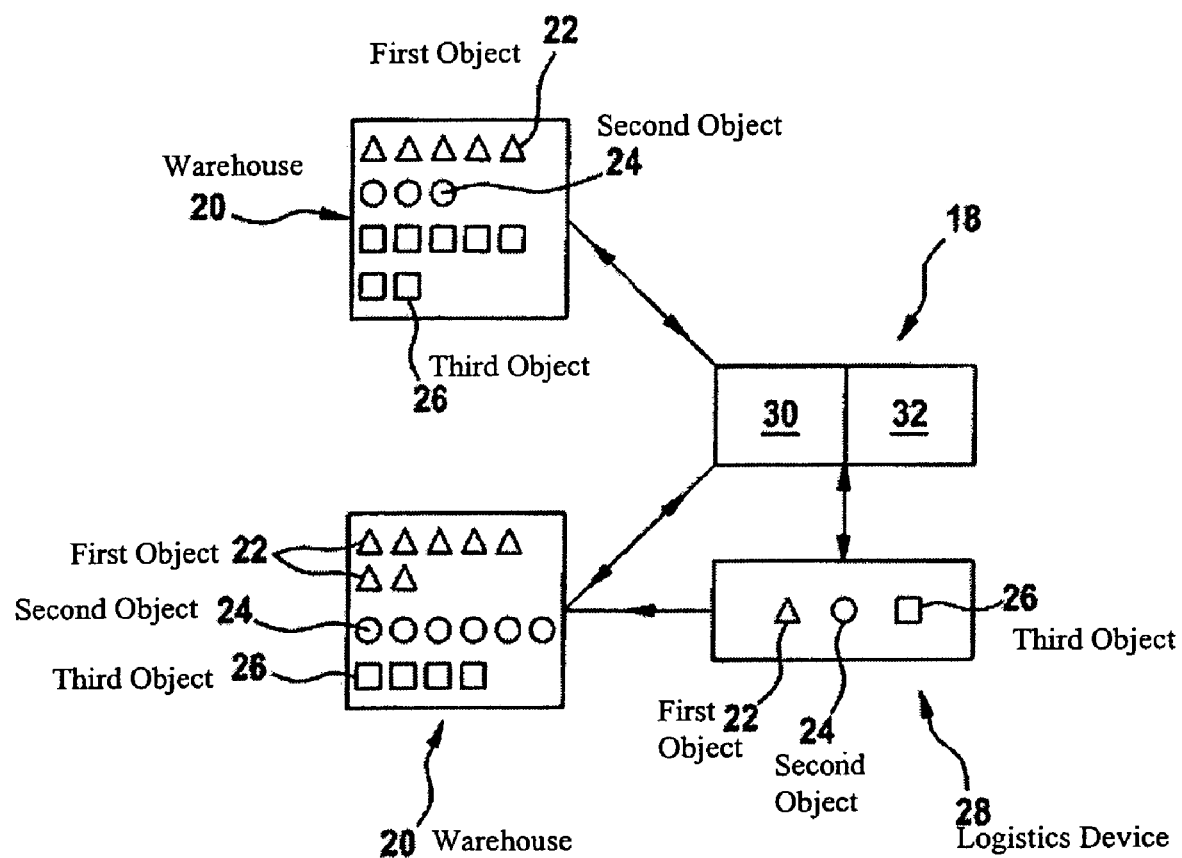
FIG. 4 shows a schematic diagram of an embodiment of a device according to the present invention.

FIG. 4 shows a schematic diagram of a device 18 and a warehouse 20 designed for storing different quantities of associated objects 22, 24, 26. A first object 22 is represented schematically as a triangle, a second object 24 is represented schematically as a circle and a third object 26 is represented schematically as a square. According to the exemplary embodiment and/or exemplary method of the present invention, associated objects 22, 24, 26 are functionally associated and/or assigned to one product group; therefore, objects 22, 24, 26 in this embodiment belong to the same object family. This means that objects 22, 24, 26 are similar and/or interconnected articles and/or products.

At a first point in time in the past, there were five items of first object 22 in warehouse 20. At a second point in time in the future, there will be seven items of first object 22 in warehouse 20. Of second object 24 there are three items in warehouse 20 at a first point in time and six items at the second point in time. Warehouse 20 holds seven items of third object 26 at the first point in time in the past and will hold four items at the future second point in time. The particular quantity of objects 22, 24, 26 changes by removal of objects 22, 24, 26 in accordance with demand. A logistic device that cooperates with device 18 is designed to stock warehouse 20 by adding objects 22, 24, 26 in suitable quantities in each case.

Device 18 in this embodiment is designed to provide a pattern forecast for one of associated objects 22, 24, 26. According to the exemplary embodiment and/or exemplary method of the present invention, device 18 aggregates the consumption series of all associated objects 22, 24, 26 to provide a pattern forecast for one of objects 22, 24, 26. A certain pattern may be determined here according to one of variants P1, P2 or P3 described above.

Furthermore, device 18 has two modules 30, 32, a first module 30 being designed to cooperate with warehouse 20 and determine particular quantities of objects 22, 24, 26 and historical curves derived from changes in these quantities over the course of time. A second module 32 is designed as a computing device and is suitable for calculating the pattern forecast. A future demand for a particular one of objects 22, 24, 26 may be determined with the pattern forecast. A future suitable quantity, ideally optimal, of particular object 22, 24, 26 is provided indirectly through device 18. To do so, device 18 controls logistic device 28 in such a way that it adds objects 22, 24, 26 to warehouse 20 in a timely manner and in sufficient quantities in each case.

What is claimed is:

1. A computer readable medium having a computer program which is executable by a computer, comprising:
a program code arrangement having program code by performing the following:
providing a pattern forecast for an object from a number of objects which are associated with one another by providing the pattern forecast based on a consumption series of the associated objects, and
normalizing preselected seasonal coefficients from the consumption series;
wherein at least one pattern is selected for each object for which the pattern forecast is provided, wherein a suitability of the at least one pattern is determined by ascertaining a deviation from a specification, wherein the at least one pattern is taken into account from a consumption series of the object for which the pattern forecast is provided, and
wherein the at least one pattern is aggregated from the at least one consumption series of a group of associated objects, wherein the at least one pattern is selected by taking into account expert knowledge, wherein a procedure for a basic value calculation for the pattern forecast is selected, and wherein the selected pattern and the selected procedure are combined for the basic value calculation.

2. The computer readable medium of claim 1, wherein exponential smoothing of any order is used for the basic value calculation.

3. The computer readable medium of claim 1, wherein the pattern forecast is determined so that the object, for which the pattern forecast is provided, is provided in a sufficient quantity.

4. A device for supplying a pattern forecast for an object from a number of objects which are associated with one another, comprising:
an arrangement to provide the pattern forecast for an object from a number of objects which are associated with one another by providing the pattern forecast based on a consumption series of the associated objects, and
a normalizing arrangement to normalize preselected seasonal coefficients from the consumption series;
wherein at least one pattern is selected for each object for which the pattern forecast is provided, wherein a suitability of the at least one pattern is determined by ascertaining a deviation from a specification, wherein the at least one pattern is taken into account from a consumption series of the object for which the pattern forecast is provided, and
wherein the at least one pattern is aggregated from the at least one consumption series of a group of associated objects, wherein the at least one pattern is selected by taking into account expert knowledge, wherein a procedure for a basic value calculation for the pattern forecast is selected, and wherein the selected pattern and the selected procedure are combined for the basic value calculation.

5. The device of claim 4, wherein the pattern forecast is determined so that the object can be provided in a sufficient quantity.

6. A device for supplying a pattern forecast for an object from a number of objects which are associated with one another, comprising:
an arrangement to provide the pattern forecast by taking into account consumption series of the associated objects, the arrangement including a processor for executing program code for performing the following:
providing a pattern forecast for an object from a number of objects which are associated with one another by providing the pattern forecast based on a consumption series of the associated objects, and
normalizing preselected seasonal coefficients from the consumption series;
wherein at least one pattern is selected for each object for which the pattern forecast is provided, wherein a suitability of the at least one pattern is determined by ascertaining a deviation from a specification, wherein the at least one pattern is taken into account from a consumption series of the object for which the pattern forecast is provided, and
wherein the at least one pattern is aggregated from the at least one consumption series of a group of associated objects, wherein the at least one pattern is selected by taking into account expert knowledge, wherein a procedure for a basic value calculation for the pattern forecast is selected, and wherein the selected pattern and the selected procedure are combined for the basic value calculation.

7. The computer readable medium of claim 1, wherein the pattern forecast is determined so that the object, for which the pattern forecast is provided, is provided in a sufficient quantity.

* * * * *